United States Patent [19]

Bates et al.

[11] 3,736,867

[45] June 5, 1973

[54] TRAVELING CYLINDER PRINTER WITH SELECTIVELY SLIDABLE CODE BARS HAVING PLURAL MARKING MEANS

[75] Inventors: Darwin S. Bates, Euclid; Edward R. Szymanski, Chesterland, both of Ohio

[73] Assignee: Addressograph-Multigraph Corporation, Cleveland, Ohio

[22] Filed: Aug. 11, 1971

[21] Appl. No.: 170,857

[52] U.S. Cl. ....................101/45, 101/269

[51] Int. Cl. ....................B41j 7/32, B41f 3/20

[58] Field of Search ....................101/45, 269, 270, 101/271, 274; 235/61.15

[56] References Cited

UNITED STATES PATENTS

| | | | |
|---|---|---|---|
| 3,413,922 | 12/1968 | Hike | 101/45 X |
| 3,373,682 | 3/1968 | Angel | 101/45 |
| 3,138,091 | 6/1964 | Maul | 101/45 |
| 3,469,240 | 9/1969 | Ryden | 101/45 X |
| 3,468,244 | 9/1969 | Hu | 101/45 X |
| 3,170,396 | 2/1965 | Argerinas | 101/45 |

*Primary Examiner*—Robert E. Pulfrey
*Assistant Examiner*—E. M. Coven
*Attorney*—Russell L. Root and Ray S. Pyle

[57] ABSTRACT

Apparatus for mechanically imprinting a document with machine scannable code indicia including timing marks and detail data marks. The timing marks are imprinted along one edge of the document, selectively by fields, and the detail marks are imprinted in the same columnar location, selectively within the fields, in vertical spaced alignment with the timing marks. The apparatus comprises a bed for supporting an embossed printing plate and a document to be imprinted. A plurality of selectively settable indicia marking elements are provided, each including a plural code marking means, for manually positioning the code marking means to a printing position in printing relationship with the document. A platen is provided for movement across the bed to imprint the document from the code marking means at the position and, simultaneously, from the printing plate.

5 Claims, 6 Drawing Figures

DARWIN S. BATES
EDWARD R. SZYMANSKI
INVENTORS
BY Ray S Pyle
ATTORNEY

TRAVELING CYLINDER PRINTER WITH SELECTIVELY SLIDABLE CODE BARS HAVING PLURAL MARKING MEANS

BACKGROUND OF THE INVENTION

Computer oriented data entry systems provide for the creation of input documents bearing machine scannable data in the form of stylized characters, as well as coded indicia such as punched openings and printed bar codes. Subsequently, these documents are machine read and the output of the scanner controls operation of peripheral equipment such as card and/or tape punches and the like.

Because of the high cost of optical (OCR) and magnetic (MICR) scanning equipment for reading stylized characters, the use of these systems is normally limited to those installations having a sufficient volume to justify the cost of the reading equipment. Therefore, for economic reasons, document scanners for reading record members provided with punched openings or bar codes are more commonly used.

Another conventional method of creating a machine scannable document is the mark sensing system, wherein predesignated marking areas on the document, hereinafter termed "blocks," are selectively darkened or marked manually as with an ordinary graphite pencil. The mark sensing system has been used extensively over the years, by various size installations and for many different types of applications, because it does not require special equipment to mark the document and expensive scanning equipment to read the marks.

The newer mark reading systems which utilize optical reading techniques offer some advantages over the original mark sensing system, but at the same time have certain drawbacks. Thus, conventional mark reading systems require the timing marks and the blocks to be pre-printed on the document. In order to obtain accurate reading results of the document by the reading machine, the pre-printing of the document necessarily requires critical tolerances insofar as printing the timing marks and the blocks in accurate register.

In some applications, limited quantities of documents are required in which many different sizes of fields are required on the documents. This imposes a further burden on the forms companies in that a variety of plates are required for printing the documents, with only small printing runs of each of the different documents. The usual results are inventory and production problems as well as a higher cost of the documents to the ultimate user.

Additionally, because the document must be provided with a block at each of the potential marking positions adjacent to each of the timing marks, and only selected ones of the blocks are subsequently marked or darkened, it is necessary to pre-print the blocks with a special ink insensitive to the scanner and to imprint the timing marks with a different ink which is scannable. Thus, the blocks which have not been darkened are not read by the scanning equipment, but all of the timing marks and the darkened blocks are detected and read.

Therefore, in the pre-printing of a single sheet document it is necessary to perform two separate printing operations, one for each of the different inks, thereby increasing the possibility of mis-register between the timing marks and the blocks. In the case of multiple sheet documents the problem is even more pronounced. Thus, in addition to the two printing operations, the form sets must be accurately collated to maintain register of the pre-printed indicia from one sheet to another.

Because the blocks on the documents are subsequently marked manually to indicate specific choices or items as desired, the success of the total system depends upon the care and accuracy exercised by the individual marking the document.

Whereas the human element resulting in erroneously marked documents is present in manually marking single sheet documents, it is even more prevalent in the marking of multiple sheet form sets.

In this regard, the top sheet of the form set receives the original mark and the tab card or last sheet of the form set is eventually scanned by the reading machine. If the pre-printed indicia is not in register, because of the printing operations or the collating of the form set as stated hereinabove, the mark transferred from the top sheet will fall outside of the predesignated block on the last sheet of the form set resulting in an improper reading operation by the scanning machine.

Further, even when the pre-printed indicia on the form set is in accurate register, if the top sheet of the form set is slightly skewed or shifted while it is being held by the person marking the form, the marks from the top sheet will not be transferred to the underlying sheets in accurate alignment. Here again, the misalignment would result in an improper reading operation.

SUMMARY OF THE INVENTION

The present invention provides a mark reading system which alleviates the disadvantages associated with the prior art. Specifically, the present arrangement eliminates the necessity of preprinting timing marks on the documents and, also, eliminates the manual operation of applying detail data marks on the documents.

The present invention comprises a device for mechanically applying both timing marks and detail data marks on a scannable document. Thus, the total mark read field or fields represented by the timing marks are selectively created for each document or series of documents, and the individual choices or items represented by the detail data marks are created by mechanical means simultaneously with the creation of the timing mark indicia.

An object of the invention is to provide a device including manually operable, selectively positionable, indicia applying means for creating machine readable code indicia on a document.

Another object of the invention is to provide a device comprising a plurality of selectively settable indicia marking elements. Each of the indicia marking elements embodies plural code marking means positionable so as to produce a single code mark, or a pair of code marks one above the other at selective locations on the document.

Another object of the invention is to provide mechanical means for printing machine readable timing marks and detail marks at selective positions on a document and, simultaneously, imprinting the document with fixed data from an embossed printing device.

A further object of the invention is to provide a device for marking a single or multi-part document with machine scannable code indicia in accurate register within selective areas of the document.

A still further object of the invention is to provide an apparatus for code marking documents including a compact, easy to operate device for mechanically producing legible and accurate code indicia on a scannable document.

The foregoing objects are attained by providing an apparatus in the nature of a data recorder comprising a bed for retaining a document to be marked, a plurality of variably settable indicia marking elements, and a platen movable across the bed to effect marking of the document. Each of the indicia marking elements embodies a pair of code marking faces, and each indicia marking element is manually movable from a first position in which the code marking faces are out of marking engagement with the document, to a second position for creating a single mark on the document from one of the code marking faces, to a third position for creating two marks on the document, in columnar arrangement, from both code marking faces of a common indicia marking element.

Other objects, features and advantages of the invention will appear hereinafter as the description proceeds.

IN THE DRAWING

DESCRIPTION OF THE PREFERRED EMBODIMENT

Figure 1:
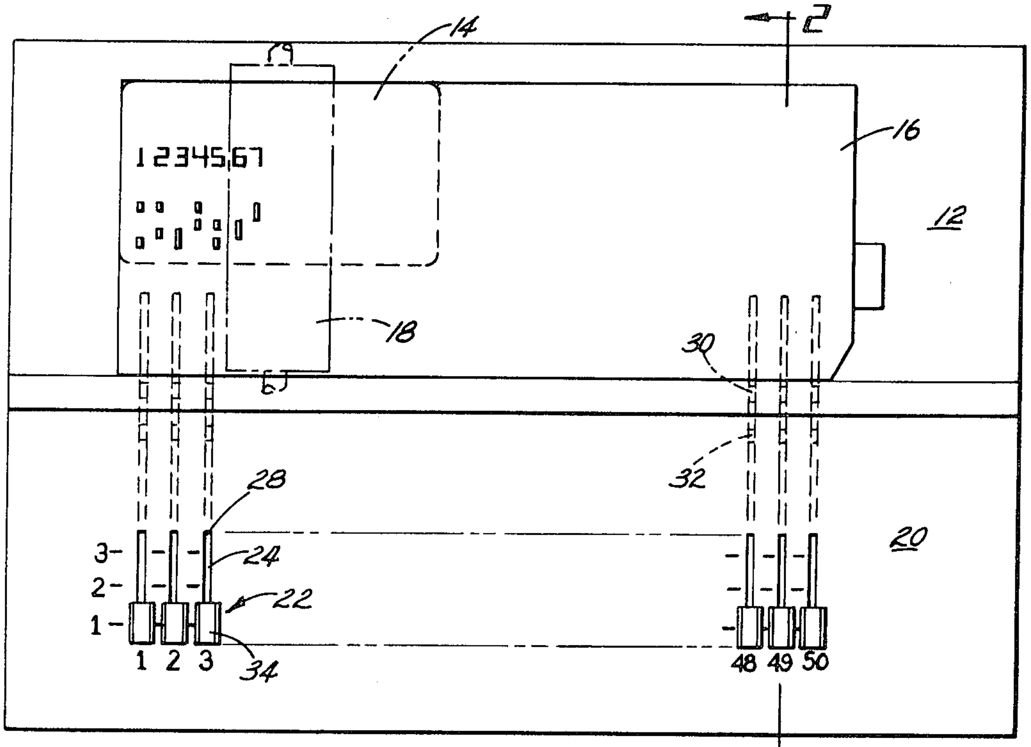
FIG. 1 is a schematic plan view of a mechanical document encoding apparatus embodying the present invention.
Figure 2:
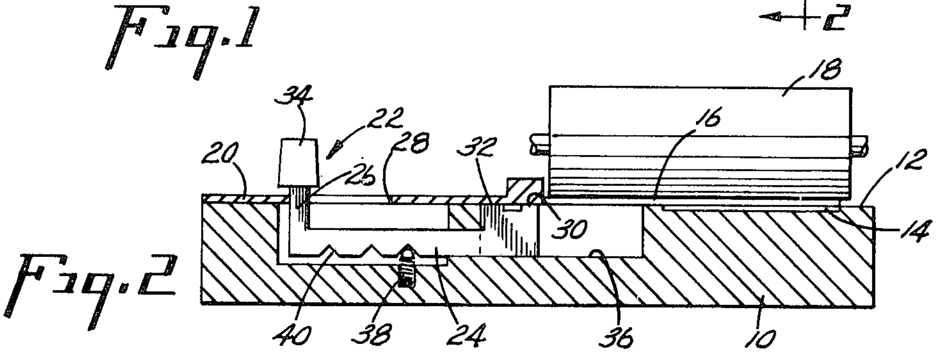
FIG. 2 is a sectional view taken substantially along the plane designated by line 2—2 of FIG. 1.

As shown in FIGS. 1 and 2, the document encoding apparatus comprises a base 10 providing a bed 12 for supporting a printing device such as an embossed card 14, and a document 16 which may be a carbon interleaved tabulating card form set positioned in overlying relation with the card 14.

A roller platen 18 is provided for imprinting the document and is movable in a path across the bed in printing engagement with the document. Since the platen structure may be any conventional arrangement well known in the art, it is not shown in detail in the drawing or described in the specification.

The base 10 is further provided with a cover plate 20 extending forwardly from the bed 12, and substantially encloses a plurality of indicia marking elements indicated generally by the reference numeral 22. As best shown in FIGS. 2 and 4–6, each indicia marking element comprises a slide member 24 having an extension 26 projecting upwardly through an opening 28 provided in the cover plate 20, and a plural code marking means comprising a pair of code marking faces 30 and 32 lying in a plane substantially corresponding to a plane defined by the top surface of the bed 12.

The extension 26 is provided with a knob 34 for grasping and manually moving the slide member 24, and the slide member is supported in its movement on a surface 36 of the base 10 which also serves as an anvil for the indicia marking elements during movement of the roller platen through an imprinting operation across the bed.

Figure 4:
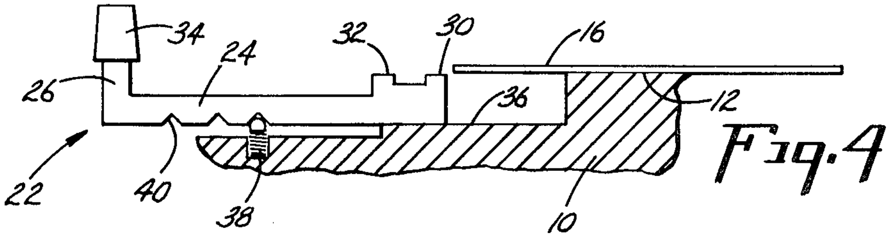
FIGS. 4–6 are sectional views similar to FIG. 2, but partially broken away, each showing a different selectively settable position of an indicia marking element.
Figure 5:
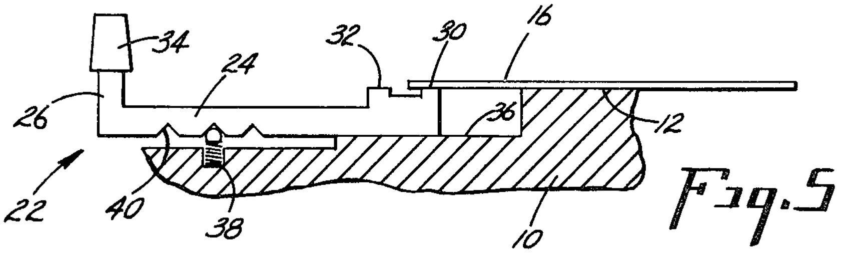
Figure 6:
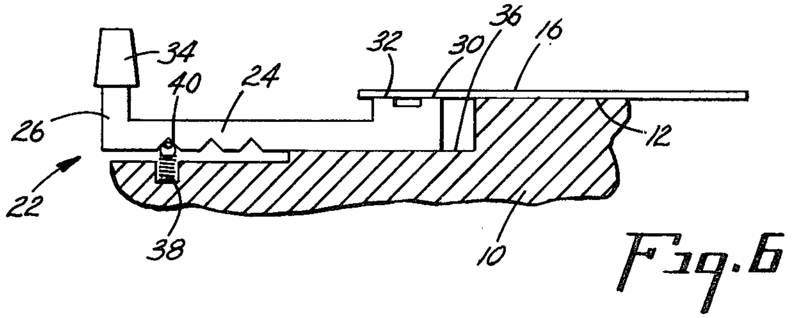

With reference to FIGS. 4–6, it will be seen that each indicia marking element 22 is movable from a first or non-printing position in which the code marking faces 30 and 32 are withdrawn from underlying relation with the document 16 as shown in FIG. 4, to a second printing position in which only the code marking face 30 is in printing relationship with the document as shown in FIG. 5, and to a third printing position in which both of the code marking faces 30 and 32 are in printing relationship with the document. The positioning of the code marking faces to each of these positions is under control of manual movement of the slide member 24, and each position is easily and accurately established by means of a spring plunger 38 coacting with appropriately positioned detent notches 40 provided in the slide member 24.

Although there may be any suitable number of indicia marking elements 22 provided in the apparatus, for purposes of this disclosure there are fifty such elements shown and described herein, each element location being sequentially numbered from 1–50 as shown in FIG. 1. Also, for operator convenience, the various positions to which each of the indicia marking elements may be moved are preferably numbered 1–3, as also shown in FIG. 1 wherein all of the indicia marking elements are shown in the first or off, non-printing position.

One of many typical applications for which the present invention is ideally suited is hospital use. Specifically, the invention provides for legible and accurate encoding of a scannable document as it might apply to an individual undergoing a medical examination. Thus, and with reference to FIG. 3, a document 16 to be encoded is provided with pre-printed data 42 indicating specific medical tests or examinations which a doctor may possible perform on a patient, each such datum 42 being printed on the document at a location corresponding to the lateral spacing of adjacent indicia marking elements 22.

Figure 3:
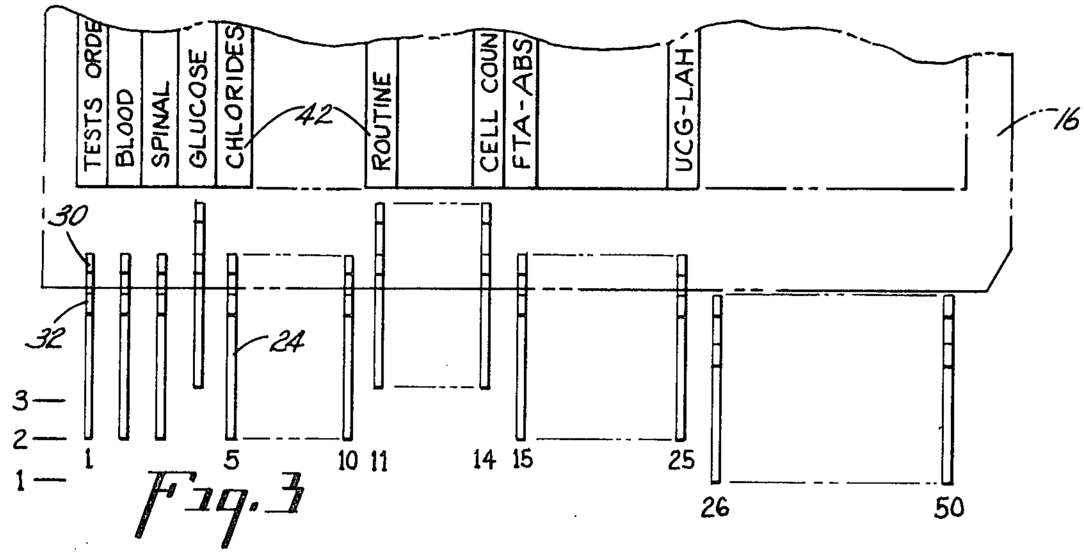
FIG. 3 is a schematic plan view illustrating variable selective positions of indicia marking elements, in association with a document to be encoded, representing a typical code marking application.

Using this as an example, in a machine capable of printing up to 50 code marking positions, let us assume that a field of only 25 positions is required for this particular medical examination. Thus, the indicia marking elements 26–50 would each remain at the first position as shown in FIG. 3. As each of the various tests is concluded, and the results are negative, the respective indicia marking element is moved from position 1 to position 2. This movement of the slide member 24 positions the code marking face 30 in underlying relationship adjacent the edge of the document and is effective to imprint a timing mark on the document in response to subsequent movement of the platen through a printing operation.

The timing mark thus created provides a dark and dense image, free of jagged outlines which might produce spurious signals during the scanning operation. Also, the mark is imprinted at the proper location and in accurate register without requiring the exercise of any particular skill or caution on the part of the machine operator. Through the facilities of the readily positionable indicia marking elements, the timing mark indicia is uniformly imprinted within one or more selected fields of the document. The uniformity and accurate registration of the coded data are maintained on all of the sheets making up a form set and, further, are consistent from one document to another.

As shown in FIG. 3, the first three indicia marking elements are positioned in the number 2 position. However, assuming that the next test under the legend "Glucose" is positive, indicating that some further treatment is required or desirable, the fourth code indicia element is moved from the first to the third position to thereby position both of the code marking faces 30 and 32 in printing relation with the document. In this position, the code face 32 will create a timing mark adjacent the edge of the document and the code face 30 will create a detail mark in the same columnar location spaced above the timing mark during a printing operation, simultaneously with the imprinting of the timing marks from each of the code marking faces 30 of the first three indicia marking elements.

Encoding the document from both of the code marking faces 30 and 32 of a single indicia marking element, to imprint a detail data mark along with a corresponding timing mark, offers all of the advantages set forth above in connection with the imprinting of a timing mark only. Additionally, however, the imprinting of the detail data marks at desired selected positions on the document obviates the requirement of pre-printing blocks on the documents and, also, the manual marking of the blocks which necessarily requires exercise of care and accuracy by the person marking the document.

To complete the example shown in FIG. 3, each of the indicia marking elements 5–10, 12, 13, and 15–25 is in position 2 to imprint a timing mark only at each respective position, and each of the indicia marking elements 11 and 14 is in position 3 to imprint both the timing mark and the data mark at their respective positions. When all of the indicia marking elements have been set accordingly, the platen is moved through a printing operation to imprint code marking indicia on the obverse side of the document at the selected areas, as a result of the platen pressing the document into printing pressure contact with the code marking faces. In this way, the document is imprinted with a field of 25 timing marks and the three data marks representing items selected in positions 4, 11 and 14.

As an added advantage, the embossed card 14 may be provided with the patient's name, number and the like, together with bar code data, for providing a printed impression which is also machine readable. Imprinting of the document from the card 14 occurs simultaneously with the imprinting of the code marking indicia created by the code faces of the indicia marking elements.

It is to be understood that the device of the present invention is not limited in its use to encoding only multiple part, carbon interleaved documents. Rather, single sheet documents can also be imprinted by utilizing a ribbon head machine, i.e., a machine provided with an inked or carbon paper ribbon which is pressed against the face of the document by the platen to thereby transfer coloring matter from the ribbon to those areas of the document overlying the embossures on the card marking faces of the indicia marking elements.

Alternately, if desired, the machine may include an ink impregnated platen instead of a ribbon to create printed impressions and code markings on the face of a single part form.

From the foregoing, it will be seen that the present invention provides a novel apparatus for creating scannable coded data at selected positions on a document. The arrangement can be used in a wide variety of applications, and provides an inexpensive and simple to operate device for mechanically encoding documents with high quality, dense and accurately positioned code marks adapted to be read by optical scanning equipment.

What is claimed is:

1. Apparatus for mechanically imprinting a document with machine scannable code indicia in selective fields of the document and at selective positions within the fields comprising:

a bed for supporting a document, said bed having a document support area defined by marginal edge boundaries corresponding to the configuration of the document to be imprinted;

a platen movable in a path across the bed in rolling engagement with the document to perform an imprinting operation;

a plurality of selectively settable indicia marking elements in the bed slidably movable in a direction towards and away from the platen path in a direction transverse thereto;

plural code marking means associated with each of the indicia marking elements and movable therewith in a linear path, said code marking means having an off position out of the path a first position in which one of the plural code marking means is in a printing position with a marginal edge of the document and a second position in which all of the plural code marking means are in printing relationship with the said marginal edge of the document on the bed; and positioning means for moving the indicia marking elements to position the plural code marking means at a desired printing position effective to create code indicia in the marginal edge of the document in response to an imprinting operation.

2. An apparatus as set forth in claim 1 in which each of the plural code marking means includes a pair of code marking faces movable from the off position to a selected position in the path in printing relationship with the marginal edge of the document on the bed.

3. An apparatus as set forth in claim 2 in which each pair of code marking faces is arranged in vertical spaced alignment so as to create code indicia in the same columnar location on the document.

4. An apparatus as set forth in claim 1 in which the first position of each of the indicia marking elements positions the code marking faces for printing a single mark, and the second position of each of the indicia marking elements positions the code marking faces for printing a pair of marks, whereby the code indicia is printed along the marginal edge of the document and includes the single marks and the pairs of marks, wherein the single marks represent timing marks and the pairs of marks represent timing marks and detail marks.

5. An apparatus as set forth in claim 1 which further includes an embossed printing plate removably positionable on the bed in underlying relationship with the document, whereby the document is imprinted from the printing plate simultaneously with the printing of the code indicia during an imprinting operation.

* * * * *